(12) United States Patent
Moore (10) Patent No.: US 10,656,316 B2
(45) Date of Patent: May 19, 2020

(54) POLARIZATION DEPENDENT FILTER, SYSTEM USING THE SAME, AND ASSOCIATED KITS AND METHODS

(71) Applicant: Novadaq Technologies ULC, Mississauga (CA)

(72) Inventor: Frederick Allen Moore, Vancouver (CA)

(73) Assignee: Novadaq Technologies ULC, Burnaby (CA)

( * ) Notice: Subject to any disclaimer, the term of this patent is extended or adjusted under 35 U.S.C. 154(b) by 341 days.

(21) Appl. No.: 15/251,154

(22) Filed: Aug. 30, 2016

(65) Prior Publication Data
US 2017/0059878 A1    Mar. 2, 2017

Related U.S. Application Data

(60) Provisional application No. 62/212,322, filed on Aug. 31, 2015.

(51) Int. Cl.
*G02B 5/30* (2006.01)
*G02B 23/24* (2006.01)
*G02B 27/00* (2006.01)

(52) U.S. Cl.
CPC .......... *G02B 5/3083* (2013.01); *G02B 5/3058* (2013.01); *G02B 23/2446* (2013.01); *G02B 27/0025* (2013.01)

(58) Field of Classification Search
CPC .............. G03F 7/70566; G03F 7/70191; G02B 27/286; G02B 5/3083; G02B 27/0025; G02B 23/24–2453; G02B 5/3025; G02B 5/3075
See application file for complete search history.

(56) References Cited

U.S. PATENT DOCUMENTS

| | | | |
|---|---|---|---|
| 4,693,568 A | 9/1987 | Takahashi | |
| 4,783,152 A | 11/1988 | Nishimoto | |
| 4,981,342 A * | 1/1991 | Fiala | G02B 5/3083 359/489.18 |
| 5,206,759 A | 4/1993 | Ono | |
| 5,212,589 A | 5/1993 | Goodman | |
| 5,276,321 A | 1/1994 | Chang | |
| 5,296,971 A | 3/1994 | Mori | |
| 5,341,240 A | 8/1994 | Broome | |
| 5,561,525 A | 10/1996 | Toyonaga | |
| 5,684,629 A | 11/1997 | Leiner | |

(Continued)

FOREIGN PATENT DOCUMENTS

| | | |
|---|---|---|
| CH | 694174 A1 | 8/2004 |
| CN | 1230115 C | 12/2005 |

(Continued)

OTHER PUBLICATIONS

US 6,692,429 B1, 02/2004, Imaizumi (withdrawn)

(Continued)

*Primary Examiner* — Cara E Rakowski
(74) *Attorney, Agent, or Firm* — Morrison & Foerster LLP (57) ABSTRACT

A system includes a birefringent lens, and a polarization filter that transmits light of a first polarization output from the birefringent lens in a first direction and filters out light of a second polarization output from the birefringent lens along the first direction.

13 Claims, 10 Drawing Sheets

(56) References Cited

U.S. PATENT DOCUMENTS

| | | |
|---|---|---|
| 5,790,314 A | 8/1998 | Duck |
| 5,822,128 A | 10/1998 | Sekine |
| 5,825,534 A | 10/1998 | Straehle |
| 5,867,315 A * | 2/1999 | Koike ............... G02B 1/02 359/489.09 |
| 6,049,422 A | 4/2000 | Ibe |
| 6,141,159 A | 10/2000 | Nishio |
| 6,269,057 B1 | 7/2001 | McDonald et al. |
| 6,301,043 B1 | 10/2001 | Lei |
| 6,665,556 B1 | 12/2003 | Alfano |
| 6,734,966 B2 | 5/2004 | Mccarthy |
| 6,817,975 B1 | 11/2004 | Farr |
| 7,057,647 B1 | 6/2006 | Monroe |
| 7,085,076 B2 | 8/2006 | Sallander |
| 7,132,654 B2 | 11/2006 | Moisel |
| 7,180,673 B2 | 2/2007 | Dowski, Jr. |
| 7,230,756 B2 | 6/2007 | Hoogland |
| 7,315,357 B2 | 1/2008 | Ortyn |
| 7,495,833 B2 | 2/2009 | Powell |
| 7,518,726 B2 | 4/2009 | Rulison |
| 7,728,975 B1 * | 6/2010 | Totzeck ............... G01J 4/04 356/124 |
| 7,733,584 B2 | 6/2010 | Kazakevich |
| 8,619,184 B2 | 12/2013 | Podoleanu |
| 9,176,069 B2 | 11/2015 | Sullivan |
| 9,547,178 B2 | 1/2017 | Erdogan |
| 9,578,252 B2 | 2/2017 | Laroia |
| 9,648,254 B2 | 5/2017 | Darty |
| 2002/0080501 A1 | 6/2002 | Kawae et al. |
| 2004/0186351 A1 | 9/2004 | Imaizumi |
| 2004/0190762 A1 | 9/2004 | Dowski |
| 2004/0228005 A1 | 11/2004 | Dowski et al. |
| 2005/0018312 A1 | 1/2005 | Gruner et al. |
| 2005/0088730 A1 * | 4/2005 | Sangu ............... G02B 27/286 359/362 |
| 2005/0146720 A1 * | 7/2005 | Hansen ............... G02B 5/3058 356/370 |
| 2005/0171079 A1 | 8/2005 | Schrimpf |
| 2005/0182321 A1 | 8/2005 | Frangioni |
| 2005/0275956 A1 | 12/2005 | Larson |
| 2006/0204204 A1 * | 9/2006 | Zenzinger ............... G02B 27/28 385/147 |
| 2006/0221475 A1 | 10/2006 | Liu |
| 2007/0012704 A1 | 1/2007 | Grinnall |
| 2007/0035852 A1 | 2/2007 | Farr |
| 2007/0081166 A1 | 4/2007 | Brown |
| 2007/0093993 A1 | 4/2007 | Stork |
| 2007/0159701 A1 * | 7/2007 | Campbell ............... G02B 5/3083 359/676 |
| 2007/0242327 A1 | 10/2007 | Powell |
| 2008/0049314 A1 | 2/2008 | Steffen et al. |
| 2008/0273247 A1 | 11/2008 | Kazakevich |
| 2009/0135612 A1 | 5/2009 | Maxik |
| 2009/0261175 A1 | 10/2009 | Kauppinen et al. |
| 2009/0290236 A1 | 11/2009 | Wang |
| 2009/0303317 A1 * | 12/2009 | Tesar ............... G02B 23/2453 348/65 |
| 2010/0079884 A1 | 4/2010 | Gere |
| 2010/0262017 A1 | 10/2010 | Frangioni et al. |
| 2011/0147615 A1 | 6/2011 | Kintz |
| 2011/0205651 A1 | 8/2011 | Yamano |
| 2011/0261175 A1 | 10/2011 | Fomitchov |
| 2011/0316982 A1 | 12/2011 | Steurer |
| 2012/0154932 A1 | 6/2012 | Katahira |
| 2012/0320164 A1 | 12/2012 | Lipton |
| 2013/0083386 A1 * | 4/2013 | Harding ............... G02B 27/283 359/240 |
| 2013/0194667 A1 | 8/2013 | Inoue |
| 2013/0253273 A1 | 9/2013 | Duckett, III |
| 2013/0278747 A1 * | 10/2013 | Yang ............... G02B 23/2476 348/82 |
| 2014/0347646 A1 * | 11/2014 | Dmitriev ............... G02B 27/0043 355/67 |
| 2015/0029389 A1 * | 1/2015 | Masanori ............... H04N 5/2254 348/373 |
| 2015/0256721 A1 | 9/2015 | Moore |
| 2015/0260652 A1 * | 9/2015 | Verstegen ............... G02B 5/3083 356/311 |
| 2015/0309225 A1 | 10/2015 | Moore |
| 2016/0291332 A1 | 10/2016 | Moore |
| 2016/0377782 A1 * | 12/2016 | Hague ............... G02B 5/3083 359/484.01 |

FOREIGN PATENT DOCUMENTS

| | | |
|---|---|---|
| CN | 101238397 A | 8/2008 |
| CN | 101663576 A | 3/2010 |
| CN | 101950041 A | 1/2011 |
| CN | 103033942 A | 4/2013 |
| DE | 2153198 A1 | 5/1973 |
| EP | 0646821 A2 | 4/1995 |
| EP | 1 582 894 A1 | 10/2005 |
| EP | 1720050 A1 | 11/2006 |
| EP | 1777942 A3 | 2/2010 |
| EP | 1607771 B1 | 6/2011 |
| EP | 2666402 A1 | 11/2013 |
| GB | 2495198 A | 4/2013 |
| JP | H01-284225 A | 11/1989 |
| JP | H075378 A | 1/1995 |
| JP | H0854515 A | 2/1996 |
| JP | H08182653 A | 7/1996 |
| JP | H08186830 A | 7/1996 |
| JP | H09 043401 A | 2/1997 |
| JP | H09224903 A | 9/1997 |
| JP | H1073762 A | 3/1998 |
| JP | H10115788 A | 5/1998 |
| JP | H10151104 A | 6/1998 |
| JP | H10 276947 A | 10/1998 |
| JP | H11281887 A | 10/1999 |
| JP | 2001128927 A | 5/2001 |
| JP | 2003018445 A | 1/2003 |
| JP | 2004047737 A | 2/2003 |
| JP | 2003-098570 A | 4/2003 |
| JP | 2003524204 A | 8/2003 |
| JP | 2004-047737 A | 2/2004 |
| JP | 2006165826 A | 6/2006 |
| JP | 2006267391 A | 10/2006 |
| JP | 2006285214 A | 10/2006 |
| JP | 2007052441 A | 3/2007 |
| JP | 2008545165 A | 12/2008 |
| JP | 2010160312 A | 7/2010 |
| JP | 2010526342 A | 7/2010 |
| JP | 2011196873 A | 10/2011 |
| JP | 2015-007777 A | 1/2015 |
| KR | 20060053961 A | 5/2016 |
| WO | WO 99/19752 A1 | 4/1999 |
| WO | 2002001934 A2 | 1/2002 |
| WO | 2010111649 A1 | 9/2010 |
| WO | 2011120688 A1 | 10/2011 |
| WO | 2012098806 A1 | 7/2012 |
| WO | 2013021704 A1 | 2/2013 |
| WO | 2013119992 A1 | 8/2013 |
| WO | 2015131278 A1 | 9/2015 |
| WO | 2017035646 A1 | 3/2017 |

OTHER PUBLICATIONS

International Preliminary Report on Patentability dated Mar. 15, 2018 for PCT Application No. PCT/CA2016/051023, filed on Aug. 30, 2016, six pages.

International Search Report for PCT/CA2016/051023 dated Dec. 13, 2016.

Australian Examination Report No. 1 dated Jun. 21, 2018 for AU Application No. 2016314795, three pages.

Japanese Office Action dated Mar. 11, 2019 for corresponding Japanese Application No. 2018-510932, 3 pages.

Extended European Search Report dated Mar. 8, 2019 for corresponding European Application No. 16840465.5.

Australian Office Action titled Examination Report No. 2 dated Jun. 15, 2019, for Patent Application No. 2016314795, four pages.

(56) References Cited

OTHER PUBLICATIONS

Canadian Notice of Allowance dated Aug. 26, 2019, for Patent Application No. 2,981,353, filed on Mar. 29, 2016, one page.
Canadian Notice of Allowance dated May 21 2019, for Patent Application No. 3,028,775, filed on Mar. 3, 2015, one page.
Canadian Notice of Allowance dated Jun. 26, 2019, for Patent Application No. 2,941,273, filed on Mar. 3, 2015, one page.
Canadian Notice of Allowance dated Aug. 27, 2019, for Patent Application No. 2,941,274, filed on Mar. 3, 2015, one page.
Canadian Office Action dated Jul. 11, 2017, for Patent Application No. 2,941,273, filed on Mar. 3, 2015, three pages.
Canadian Office Action dated Jul. 12, 2017 for Patent Application No. 2,941,274, filed on Mar. 3, 2015, four pages.
Canadian Office Action dated Jul. 16, 2018, for Patent Application No. 2,981,353, filed on Mar. 29, 2016, four pages.
Canadian Office Action dated Jul. 3, 2018, for Patent Application No. 2,941,274, filed on Mar. 3, 2015, four pages.
Canadian Office Action dated Jun. 21, 2018, for Patent Application No. 2,941,273, filed on Aug. 31, 2016, three pages.
Chinese Office Action dated May 30, 2018 for CN Application No. 201580021609.X filed on Mar. 3, 2015, twenty- seven pages. (including English translation).
Chinese Office Action dated May 7, 2019 for CN Application No. 201580021609.X filed on Mar. 3, 2015, seven pages. (including English translation).
Chinese Office Action dated Mar. 21, 2019, for Patent Application No. 2016800317428, filed Mar. 29, 2016, twenty-two pages. (including English translation).
Chinese Office Action dated Jan. 8, 2019 for Patent Application No. 201580022991.6 filed on Nov. 4, 2016, sixteen pages. (including English translation).
Chinese Office Action dated Jun. 22, 2018 for CN Application No. 201580022991.6 filed on Nov. 4, 2016, twenty-four pages. (including English translation).
Chinese Office Action dated Sep. 26, 2019, for Patent Application No. 201580022991.6 filed on Nov. 4, 2016, ten pages. (including English translation).
Chinese Office Action dated Sep. 30, 2019, for Patent Application No. 2016800317428, filed Mar. 29, 2016, twenty-one pages. (including English translation).
European Communication Pursuant to Rules 70(2) and 70a(2) EPC dated Aug. 18, 2017 for EP Application No. 15758117.4, filed on Sep. 5, 2016, one page.
European Office Action dated Jul. 29, 2019, for Patent Application No. 167711407, filed Mar. 29, 2016, five pages.
European Office Action dated Nov. 23, 2018 for Patent Application No. 157581174 filed Mar. 3, 2015, four pages.
European Office Action dated Dec. 20, 2018 for Patent Application No. 15758256.0, filed Mar. 3, 2015, five pages.
European Office Action dated Oct. 11, 2019, for Patent Application No. 15758256.0, filed Mar. 3, 2015, five pages.
European Office Action dated Sep. 18, 2019, for Patent Application No. 15758117.4, filed Mar. 3, 2015, four pages.
European Search Report and Search Opinion dated Aug. 21, 2018, for Patent Application No. 167711407, filed Mar. 29, 2016, eight pages.
European Search Report dated Jul. 31, 2017 for Ep Application No. 15758117.4, filed on Mar. 3, 2015, eight pages.
European Search Report dated Sep. 11, 2017 for Patent Application No. 15758256.0, filed Mar. 3, 2015, ten pages.
Gross. H et al. (ed.) (Jan. 1, 2007). "Handbook of Optical Systems,- Aberration Theory and Correction of Optical Systems," in Handbook of Optical Systems, Aberration Theory and Correction of Optical Systems, Wiley-VCH, Weinheim, 3:377-379.
Indian Office Action dated Mar. 27, 2019 for in Application No. 201617030105 filed Mar. 3, 2015, seven pages.
Indian Office Action dated May 17, 2019, for Patent Application No. 201617030106, filed Mar. 3, 2015, six pages.
International Preliminary Report on Patentability dated Oct. 12, 2017 for PCT Application No. PCT/CA2016/050365, filed on Mar. 29, 2016, seven pages.
International Preliminary Report on Patentability dated Sep. 15, 2016 for PCT/CA2015/050158 filed Mar. 3, 2015, five pages.
International Preliminary Report on Patentability dated Sep. 15, 2016 for PCT/CA2015/050162, filed Mar. 3, 2015, six pages.
International Search Report dated May 13, 2015 for PCT/CA2015/050162, filed Mar. 3, 2015, five pages.
International Search Report dated May 14, 2015 for PCT Application No. PCT/CA2015/050158 filed Mar. 3, 2015, three pages.
International Search Report dated May 31, 2016, for International Application No. PCT/CA2016/050365, filed on Mar. 29, 2016, four pages.
Japanese Final Office Action dated Jun. 11, 2018, for Patent Application No. 2016-555505, filed on Sep. 2, 2016, eleven pages. (including English translation).
Japanese Notice of Allowance dated Jan. 24, 2020, for Japanese Patent Application No. 2018-192776, filed Mar. 3, 2015, seven pages. (including English translation).
Japanese Notice of Allowance dated Oct. 4, 2019, for Patent Application No. 2017551311, filed Mar. 29, 2016, seven pages. (including English translation).
Japanese Notice of Allowance dated Jan. 7, 2019, for Japanese Application No. 2016-555473, filed on Mar. 3, 2015, six pages. (including English translation).
Japanese Office Action dated Dec. 13, 2019, for Japanese Application No. 2018-510932 filed on Aug. 30, 2016, seven pages. (including English translation).
Japanese Office Action dated Jul. 8, 2019, for Japanese Patent Application No. 2018-192776, filed Mar. 3, 2015, nine pages. (including English translation).
Japanese Office Action dated Mar. 11, 2019, for Japanese Application No. 2018-510932 filed on Aug. 30, 2016, six pages. (including English translation).
Japanese Office Action dated Nov. 9, 2018, for Patent Application No. 2017551311, filed Mar. 29, 2016, eleven pages. (including English translation).
Japanese Office Action dated Apr. 20, 2018, for Japanese Application No. 2016-555473, filed on Mar. 3, 2015, nine pages. (including English translation).
Japanese Office Action dated Aug. 25, 2017, for Japanese Application No. 2016-555473, filed on Mar. 3, 2015, eleven pages. (including English translation).
Japanese Office Action dated Jul. 14, 2017, for Patent Application No. 2016-555505, filed on Sep. 2, 2016, thirteen pages. (including English translation).
Japanese Office Action dated Nov. 25, 2019, for Japanese Application No. 2019-019015, filed Mar. 3, 2015, six pages. (including English translation).
Korean Final Office Action dated Jul. 24, 2018 for Korean Application No. 2016-7027305, filed on Mar. 3, 2015, seven pages. (including English translation).
Korean Notice of Allowance dated Nov. 12, 2018 for Korean Application No. 10-2016-7026942 filed on Sep. 28, 2016, three pages. (including English translation).
Korean Office Action dated Dec. 13, 2017 for Korean Application No. 2016-7026942 filed on Sep. 28, 2016, twelve pages. (including English translation).
Korean Office Action dated Nov. 23, 2018 for Korean Application No. 10-2016-7027305, filed on Mar. 3, 2015, thirteen pages. (including English translation).
Korean Office Action dated Sep. 15, 2017 for Korean Application No. 10-2016-7027305, filed on Mar. 3, 2015, fourteen pages. (including English translation).
Reichman, J. (Jun. 1998). "Handbook of Optical Filters for Fluorescence Microscopy," pp. 2-30, G1-G5, (37 pages) located at: http://www.cyto.purdue.edu/cdroms/micro1/7_spon/chroma/handbk3.pdf, last visited on Jan. 31, 2020.
U.S. Advisory Action dated Nov. 1, 2017, for U.S. Appl. No. 14/636,448, filed Mar. 3, 2015, four pages.
U.S. Final Office Action dated Aug. 15, 2018, for U.S. Appl. No. 14/636,448, filed Mar. 3, 2015, seven pages.

(56) References Cited

OTHER PUBLICATIONS

U.S. Final Office Action dated Aug. 2, 2017, for U.S. Appl. No. 14/636,448, filed Mar. 3, 2015, six pages.
U.S. Final Office Action dated Dec. 20, 2019, for U.S. Appl. No. 14/636,658, filed Mar. 3, 2015, twenty-four pages.
U.S. Final Office Action dated Oct. 18, 2018, for U.S. Appl. No. 14/636,658, filed Mar. 3, 2015, twenty-five pages.
U.S. Final Office Action dated Sep. 1, 2017, for U.S. Appl. No. 14/636,658, filed Mar. 3, 2015, sixteen pages.
U.S. Non-Final Office Action dated Dec. 14, 2017, for U.S. Appl. No. 14/636,448, filed Mar. 3, 2015, eight pages.
U.S. Non-Final Office Action dated Feb. 8, 2018, for U.S. Appl. No. 14/636,658, filed Mar. 3, 2015, twenty pages.
U.S. Non-Final Office Action dated Jun. 27, 2017, for U.S. Appl. No. 15/083,357, filed Mar. 29, 2016, thirteen pages.
U.S. Non-Final Office Action dated May 8, 2019, for U.S. Appl. No. 14/636,658, filed Mar. 3, 2015, twenty-two pages.
U.S. Non-Final Office Action dated Nov. 4, 2016, for U.S. Appl. No. 14/636,448, filed Mar. 3, 2015, eight pages.
U.S. Non-Final Office Action dated Oct. 21, 2016, for U.S. Appl. No. 14/636,658, filed Mar. 3, 2015, eleven pages.
U.S. Non-Final Office Action dated Sep. 5, 2019, for U.S. Appl. No. 14/636,448, filed Mar. 3, 2015, eleven pages.
U.S. Notice of Allowance dated Feb. 1, 2018, for U.S. Appl. No. 15/083,357, filed Mar. 29, 2016, eight pages.
U.S. Restriction Requirement dated May 2, 2016, for U.S. Appl. No. 14/636,658, filed Mar. 3, 2015, nine pages.
Written Opinion of the International Searching Authority dated Dec. 13, 2016 for International Application No. PCT/CA2016/051023, filed on Aug. 30, 2016, four pages.
Written Opinion of the International Searching Authority dated May 13, 2015 for PCT/CA2015/050162, filed Mar. 3, 2015, four pages.
Written Opinion of the International Searching Authority dated May 14, 2015 for PCT Application No. PCT/CA2015/050158 filed Mar. 3, 2015, three pages.
Written Opinion of the International Searching Authority dated May 31, 2016, for International Application No. PCT/CA2016/050365, filed on Mar. 29, 2016, five pages.
Chinese First Office Action dated Mar. 9, 2020, for Patent Application No. 201680063915.4, filed Aug. 30, 2016, 23 pages.

\* cited by examiner

POLARIZATION DEPENDENT FILTER, SYSTEM USING THE SAME, AND ASSOCIATED KITS AND METHODS

CROSS-REFERENCE TO RELATED APPLICATION

The present application claims priority under 35 U.S.C. § 119(e) to U.S. Provisional Application No. 62/212,322, filed on Aug. 31, 2015, and entitled: "Polarization Dependent Filter, System Using the Same, and Associated Kits and Methods," which is incorporated herein by reference in its entirety.

TECHNICAL FIELD

The present disclosure relates generally to the field of optical lens systems. More specifically, the disclosure relates to a polarizing filter that may be used to improve off-axis performance in imaging systems having birefringent lenses.

BACKGROUND

Optical materials, such as glass and crystal, exhibit many different properties affecting both the optical performance and the application suitability. An optical material's index of refraction determines the velocity of light through the material. An optical material's dispersion describes the dependence of its index of refraction upon wavelength. An optical material's hardness describes its mechanical resistance to physical contact. An optical material's chemical resistance describes its resistance to moisture and chemical attack. An optical material's electro-optic properties describe how some characteristics, such as form and refractive index, vary with changes to the local electro-magnetic field.

An imaging system may include, e.g., lenses, mirrors, windows, filters, crystals, and so forth. Light passes through the optics and interacts with each material in a manner unique to that material. An imaging system typically transposes spatial information from an object in the field of view, to an image at an image field. One or both of the object plane and image plane may be inside or outside the system. For example, a camera may be described as having an object field outside the system and an image plane inside the system. A projector, however, may be described as having an object field inside the system and an image plane outside the system.

A subset of optical materials, most typically crystal materials, exhibit birefringence. In a birefringent material, the refractive index depends not only on wavelength, but also on the polarization state of the light. A birefringent material will refract light of one polarization state differently than it will refract light of another polarization state. If a lens is made using a birefringent material, and if the incident light on the birefringent lens is randomly polarized, then the birefringent lens will produce two images, superimposed, where one image is slightly larger than the other. On the optical axis, the features in the two images will be concentric. However, further from the optical axis, there may appear blurring in the fine detail as the lens exhibiting slightly different powers, or magnifications, for the two polarization-dependent beam paths.

SUMMARY

One or more embodiments is directed to a system including a birefringent lens, and a polarization filter that transmits light of a first polarization output from the birefringent lens in a first direction and filters out light of a second polarization output from the birefringent lens along the first direction.

The system may include a translation mechanism to change a distance between the polarization filter and the birefringent lens.

The system may include a rotation mechanism to change a relative angle between the polarization filter and the birefringent lens.

The polarization filter may be positioned at or near a system stop position or any conjugate thereof.

The polarization filter may filter all light incident thereon.

The polarization filter may transmit all light incident in a central region thereof and filter light outside the central region.

The system may include a rotation mechanism to change a relative angle between the polarization filter and the birefringent lens.

The birefringent lens may be fixed and the rotation mechanism may rotate the polarization filter.

The system may include a camera system having camera optics receiving light from the birefringent lens.

The polarization filter may be between a system aperture of the camera system and an image plane thereof.

The polarization filter may be closer to the system aperture than to the image plane.

The polarization filter may be farther from the system aperture than from the image plane.

The polarization filter may be a partial polarization filter.

The system may include a rotation mechanism to change a relative angle between the polarization filter and the birefringent lens.

The birefringent lens may be fixed and the rotation mechanism may rotate the polarization filter.

The polarization filter may transmit all light incident in a central region thereof and filter light outside the central region.

The polarization filter may be between the birefringent lens and the camera optics.

The polarization filter may transmit light incident in a central region thereof and filter light outside the central region.

The system may include a rotation mechanism to change a relative angle between the polarization filter and the birefringent lens.

The birefringent lens may be fixed and the rotation mechanism may rotate the polarization filter.

The polarization filter may be at a system aperture of the camera.

The polarization filter is a full polarization filter.

The system may include a camera system and an endoscope system between the birefringent lens and the camera system.

The endoscope system may include a relay system and an ocular system.

The polarization filter may be in the relay system.

The polarization filter may be between the relay system and the ocular system.

The polarization filter may be between the birefringent lens and the relay system.

The polarization filter may be in the endoscope system and may be a fixed, polarization-dependent partial filter.

The polarization filter may be in the camera system and may be an adjustable, polarization-dependent partial filter.

The polarization filter may be after a rear window of the endoscope system and before a front window of the camera system, and may be polarization-dependent full filter.

One or more embodiments is directed to a method of filtering polarized light, the method including receiving light from a birefringent lens, transmitting light of a first polarization output from the birefringent lens in a first direction to form an image, and filtering out light of a second polarization output from the birefringent lens along the first direction.

Filtering out light may include fully filtering out light of the second polarization.

Filtering out light may include transmitting a central portion of light of the second polarization and filtering out remaining light of the second polarization.

One or more embodiments is directed to kit for use with a system having birefringent lens, the kit including a polarization filter that transmits light of a first polarization output from the birefringent lens in a first direction and filters out light of a second polarization output from the birefringent lens along the first direction.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Generally, corresponding or similar reference numbers will be used, when possible, throughout the drawings to refer to the same or corresponding parts.

Details of the above various embodiments will be described in detail below. While a general outline of regions of the polarization filter apertures may be illustrated below as being round, these regions may be square, oval, rectilinear, or take any other shape. Additionally, the different regions may have different shapes and/or some regions may be discontinuous. Further, the figures are intended as representative and not exact. Thus, the figures do not represent exact proportions of, or distances between, constituent elements, unless specifically noted. Finally, the description of applications using the polarization dependent aperture filter have been simplified for clarity by eliminating additional elements or specifics of particular elements that would not aid in further understanding of embodiments, and would be understood by those of skill in the art.

Definitions

"Polarization-dependent full filter" refers to a filter that filters light across the entirety of the filter's aperture.

"Polarization-dependent partial filter" refers to a filter having an unfiltered region in a central portion of its aperture and a filtered region in the remainder of its aperture. In instances where fully filtered light results in too great a loss of flux at the detector, and therefore results in reduced image quality, partially filtered light may be employed. A partial filter may transmit a portion of the incident light as fully filtered, and a portion of the light as not filtered. A partial filter may differentiate between the filtered and unfiltered portions spatially: the filtered light passes through one zone of the aperture and the unfiltered passes through another portion as will be explained in more detail below.

"Chief ray" refers to a ray launched from a point on the object such that it crosses the system's optical axis at the aperture stop. Each object point emits one chief ray and each chief ray carries a broad range of wavelengths.

"Marginal ray" refers to a ray launched from a point on the object such that is passes through the optical system's aperture at the extreme limit of the aperture. Each object point emits a cone of marginal rays that, when they pass through the system stop, scribe a perimeter equivalent to the geometric limits of the stop size. Stopping down the system reduces the acceptance angle subtended by the marginal ray cone emitted at the object plane.

"Lens" is any element with optical power.

Overview

Figure 1A:
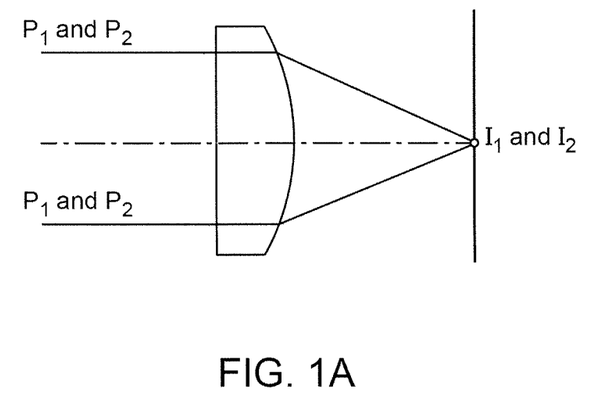
FIGS. 1A and 1B illustrate the effect that a birefringent lens may have upon the on-axis and off-axis rays in an imaging system.
Figure 1B:
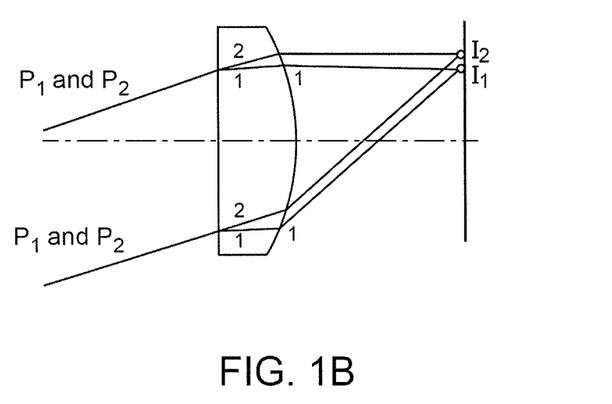

When a birefringent material is used as an optical lens in an imaging system, e.g., an endoscope, a borescope, a camera, and so forth, then the image plane will have two images $I_1$ and $I_2$: one for one polarization state $P_1$ and one for another polarization state $P_2$. FIGS. 1A and 1B illustrate how these two images $I_1$ and $I_2$ will be superimposed with slightly different magnifications.

Referring to FIG. 1A, the on-axis rays are concentric at the image plane, whereas, referring to FIG. 1B, the off-axis rays exhibit spatial separation such that the rays associated with one type of polarization $P_1$ are focused slightly closer to the optical axis than are the rays of another type of polarization $P_2$. Depending on the sensor or other means of observing or recording the image, the off-axis features may exhibit noticeable deterioration, since two images $I_1$ and $I_2$ are superimposed, with one having slightly greater overall size than the other.

Even given these issues at the image plane, a birefringent material may be used in an imaging system because these materials may exhibit characteristics that are not obtainable in optical glass. For example, sapphire is very hard, is chemically resistant, and has refractive index and dispersion characteristics different than those among optical glasses In an imaging system having a powered optic made of a birefringent material, filtering and removal of all of the light for one polarization state before being incident on the image field may be performed. Such a solution may improve the overall image quality, provided the system has adequate illumination to permit the loss of the filtered portion.

In an imaging system having a powered optic made of a birefringent material in which restrictions on filtering arise from illumination constraints, filtering and removal of only part of the light for one polarization state such that one portion of the field, e.g., a central portion, remains unfiltered, and another portion of the field, for example the off-axis portion, is entirely filtered of the light of one polarization state. Such a solution would permit full throughput to the central portion of the field, where imaging performance is largely uncompromised by the influence of the birefringent lens, and simultaneously permit improved off-axis image quality.

In the aforementioned system, there may be additional advantage if the rate of transition, from the unfiltered portion across the field to the filtered portion of the field, can be adjusted such that such transition occurs over a region of the field, and is not abrupt. Examples of such filters are described in detail below.

Polarization Dependent Filters

Figure 2A:
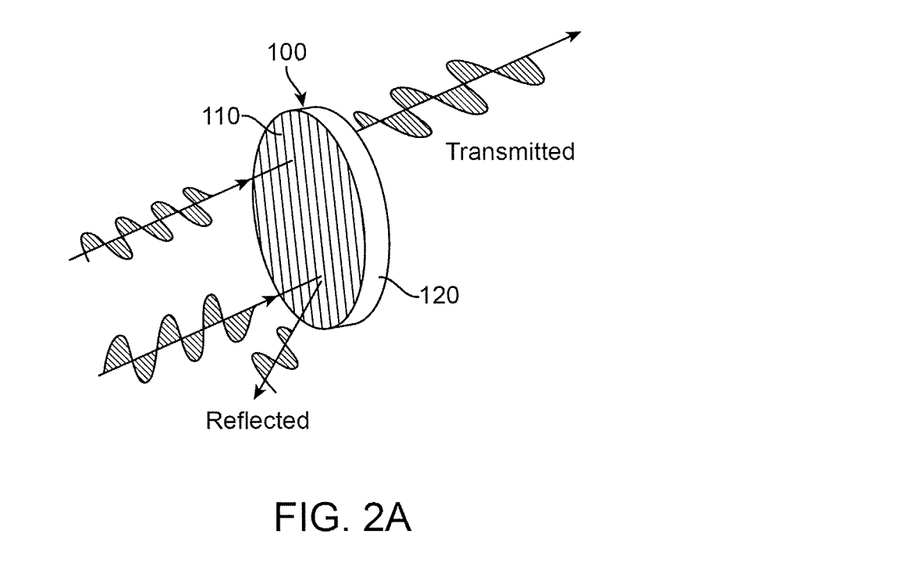
FIGS. 2A and 2B illustrate the basic function of a wire grid polarizer.
Figure 2B:
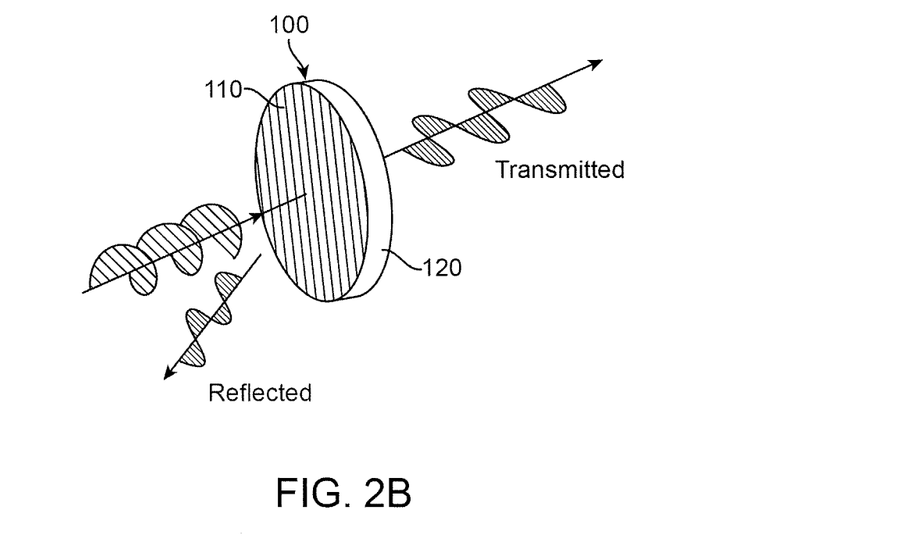

Referring to FIGS. 2A and 2B, a polarization-dependent filter 100 may include a wire grid 110 on a substrate 120. It should be understood that other technologies achieve the same general result and may be more or less practical for different condition, e.g., absorptive polarizers, beam splitting polarizers, birefringent polarizers, thin film polarizers, and so forth.

In FIG. 2A, light having linear polarization is incident upon the polarization-dependent filter 100. The beam for which the electric vector is aligned to the grid will be reflected (rejected, in the case of the imaging system) and the remainder beam passes through. In FIG. 2B, circularly polarized light is incident upon the polarization-dependent filter 100. The beam is split into its linearly polarized components, which are then rejected or passed in accordance with FIG. 2A.

Figure 3A:
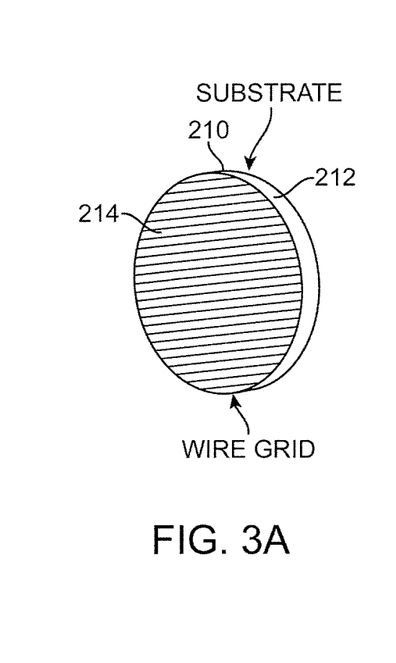
FIGS. 3A to 3C illustrate examples of wire grid polarizer substrates.
Figure 3B:
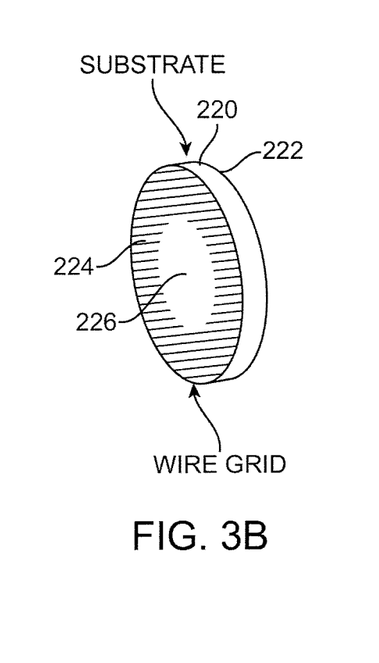
Figure 3C:
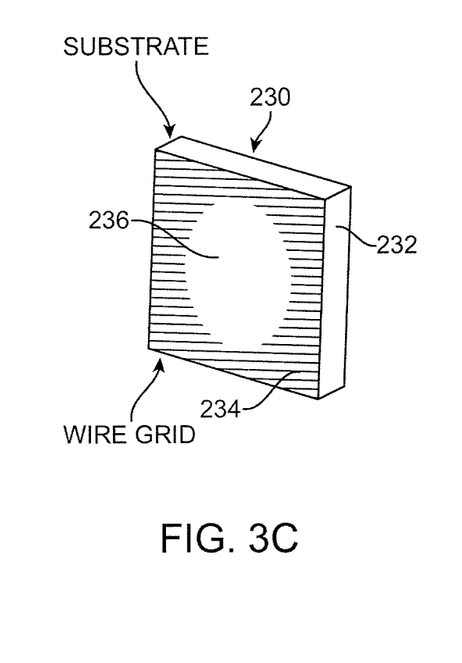

Referring to FIGS. 3A to 3C the pattern, position, and area of the wire grid may be continuous or variable across a substrate, whose shape is also variable. Such patterns are achieved through masking operations during the wire grid formation process. It should be understood that similar options for partial-aperture polarizers apply to other types of polarized beam separation. For example, a thin film polarizer may use masking techniques during the multi-layer dielectric film coating process in order to produce an aperture having regional dependencies.

For example, as illustrated in FIG. 3A, a polarization-dependent full filter 210 may include a circular substrate 212 with a wire grid 214 across an entirety thereof to be used as a full aperture filter. Such a full aperture filter may be used anywhere before or after a birefringent lens in the system and will not vary the illumination across the image plane, as all light is treated equally.

As illustrated in FIG. 3B, a polarization-dependent partial filter 220 may include a circular substrate 222 with a wire grid 224 only partially covering the circular substrate 222, leaving an unfiltered region 226. As shown in FIG. 3B, the wire gird 224 may only be in a periphery of the circular substrate 222, while the unfiltered region 226 may be in a central circular region thereof, to be used as an annular filter. Another example of polarization-dependent partial filter 230 is illustrated in FIG. 3C. Here, the polarization-dependent partial filter 230 includes a square substrate 232 with a wire grid 234 only partially covering the square substrate 232, leaving an unfiltered region 236. As shown in FIG. 3C, the wire gird 234 may only be in a periphery of the square substrate 232, while the unfiltered region 236 may be in a central circular region thereof, to be used as an annular filter. Such polarization-dependent partial filters may be used at or near an image plane or conjugate thereof, and do not reduce light intensity at a central portion of the image.

Systems Incorporating Polarization Dependent Apertures

Figure 4A:
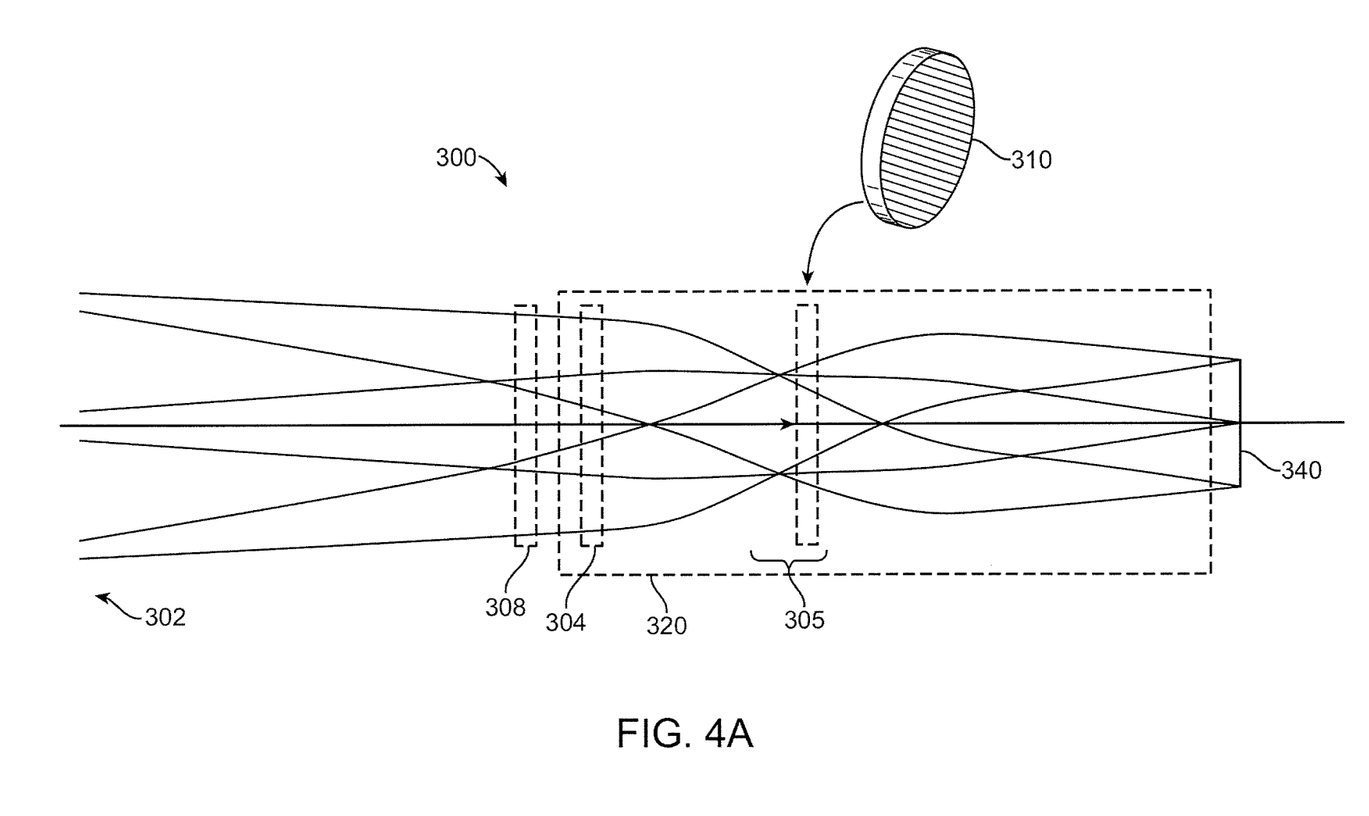
FIGS. 4A and 4B illustrate some of the functional positions for full aperture and partial aperture polarizing elements.

Referring to FIG. 4A, an imaging system 300 is depicted schematically. The object field 302 is to the left of the diagram. Lenses responsible for image formation exist within boundary 320 but are not shown explicitly; however their effect on beam shaping is illustrated. An image 340 forms to the right. The system uses a birefringent lens 304. If conditions are such that object illumination is more than adequate, a polarization-dependent full filter 310, i.e., a filter that passes only a specific polarization throughout its aperture, may be placed at or near the system aperture, or system stop position, 305 or any conjugate thereof, or near to any conjugate thereof, or in any position where all of the beam may pass through the filter unvignetted, and where the filter's insertion is enabled by the optical prescription. Additionally, since the filtering function of the polarization-dependent filter relative to the birefringent lens is angular only, the polarization-dependent filter may be placed before or after the birefringent lens. For example, it could be placed in front of the system at 308.

In contrast, in conditions where object illumination is somewhat compromised, only those portions of the field most adversely affected by the birefringent lens, such as the off-axis portion of the image, may be filtered. In such instances, a polarization-dependent partial filter may be inserted at a plane that is not at or near the system aperture, nor at or near a conjugate to the system aperture. An example of such a polarization-dependent partial filter 330 is depicted in the upper right portion of FIG. 4B. Filter 330 has an unfiltered central region 326 and a wire grid polarization filter annulus 324.

Figure 4B:
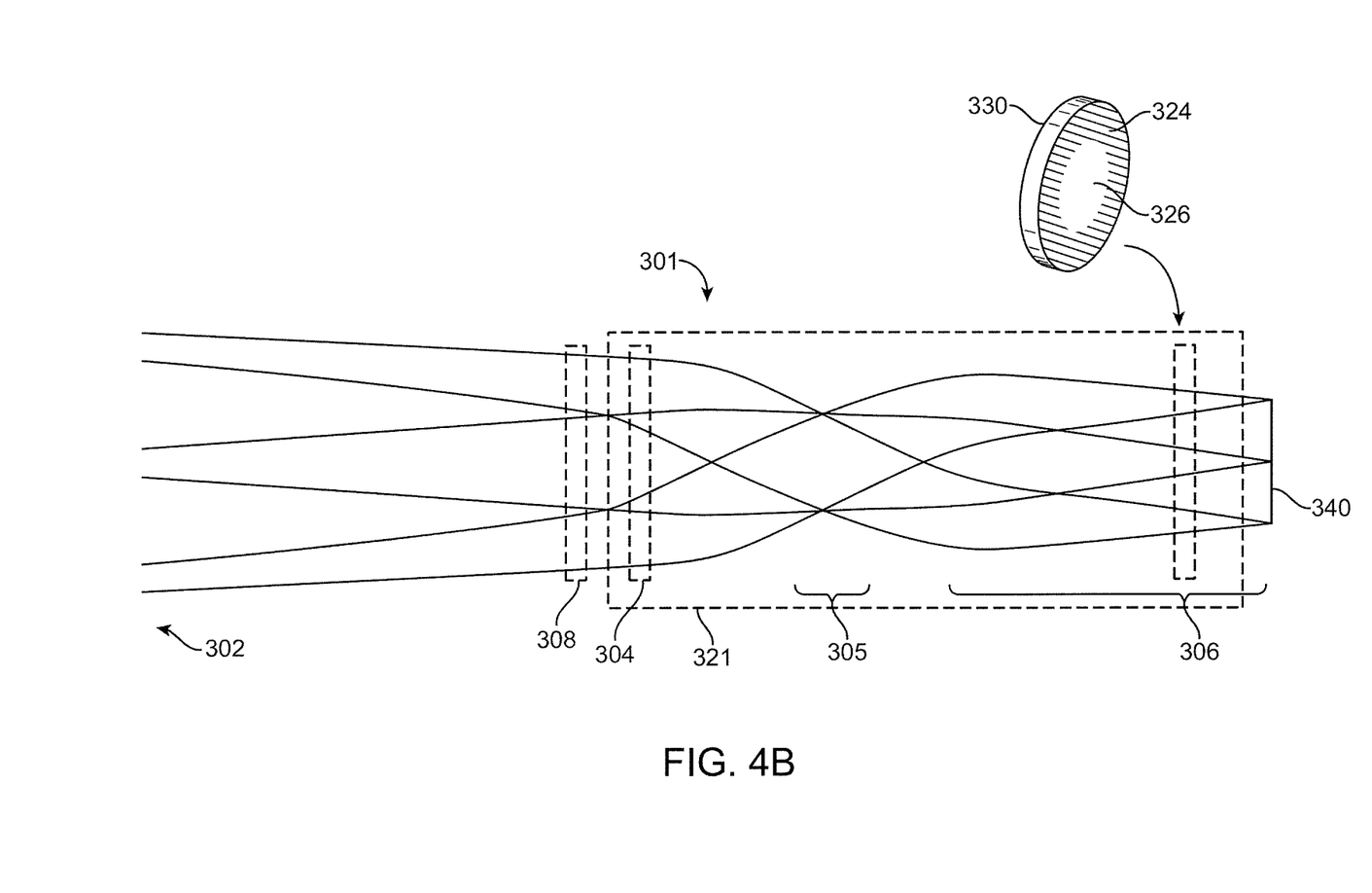

The filter 330 may be positioned in a range of locations that is not near to the system aperture 305, or conjugate thereof. More specifically, the filter is located in regions where ray bundles associated with field positions are separated (ie, at an image 340 or image conjugate) or partially separated (ie: in the regions located between system aperture 305 and image 340, or between system aperture 305 and object 302, or between conjugates of the aperture and the image). In FIG. 4B, the partial filter 330 is located in the system's image space 306. Additionally, since the filtering function of the polarization-dependent filter relative to the birefringent lens is angular only, the polarization-dependent filter may be placed before or after the birefringent lens. For example, it could be placed in front of the system at 308.

As illustrated in FIGS. 5A to 5D, the position of a partial aperture filter, e.g., an annular polarized aperture filter, relative to an image plane or conjugate thereof will determine the size of the region over which the transition from unfiltered to filtered occurs, i.e., a transition region in the image, from unfiltered to filtered.

Figure 5A:
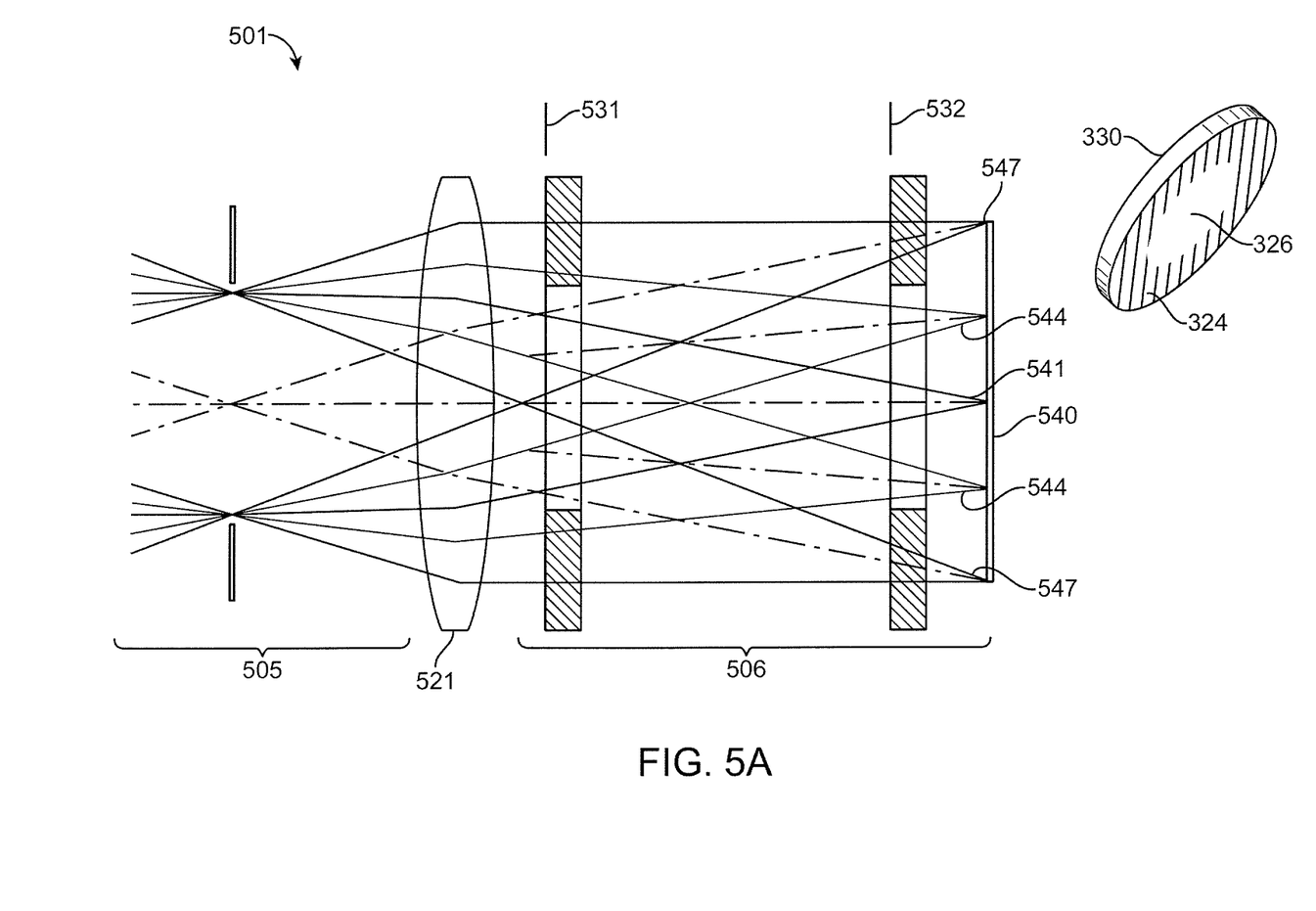
FIGS. 5A to 5D illustrate some functional positions for a partial aperture polarizer in a camera system and how such positions affect soft or hard transitions in the image plane.

Referring to FIG. 5A, a polarization filter 330 is positioned within a beam formed in part by an upstream birefringent lens. The filter is defined by a polarization-dependent portion 324 and a clear aperture portion 326. The filter 330 may be moved axially, and may also be rotated. Rotation of the filter will control the alignment of the filter's polarization features relative to the incident light's electric vector. This characteristic is well established in the field of optics and is not described in detail here. FIG. 5A illustrates the effect of moving the filter 330 axially. Filter 330 is shown in two locations, 531 and 532. It should be understood that in practice there will be only one filter in one position at any one time. If the filter 330 is positioned farther from the image 540, to position 531, the light bundles forming the on-axis point 541 pass through unfiltered and therefore are not attenuated. If the filter 330 is moved close the image 540, to position 532, again the light associated with the on-axis point 541 is unaltered. However, the light rays forming a mid-field off-axis point 544 and the light rays forming a far-field off-axis point 547 are each affected differently by the position of the filter. If the filter 330 is positioned at 531, then the rays forming point 544 are slightly filtered, the rays forming point 547 are partially filtered, and the effect is such that the rays forming 547 are more filtered than the rays forming 544. If the filter 330 is positioned at 532, then the rays forming point 544 are not filtered and the rays forming point 547 are fully filtered. FIG. 5A illustrates a position-dependent characteristic that is partly the result of the filter's position and partly the result of the divergent nature of the image space beam constructed for the illustration. It should be understood that if the image space uses convergent light, or telecentric light, this will influence the nature of the system. This is discussed further below.

Figure 5B:
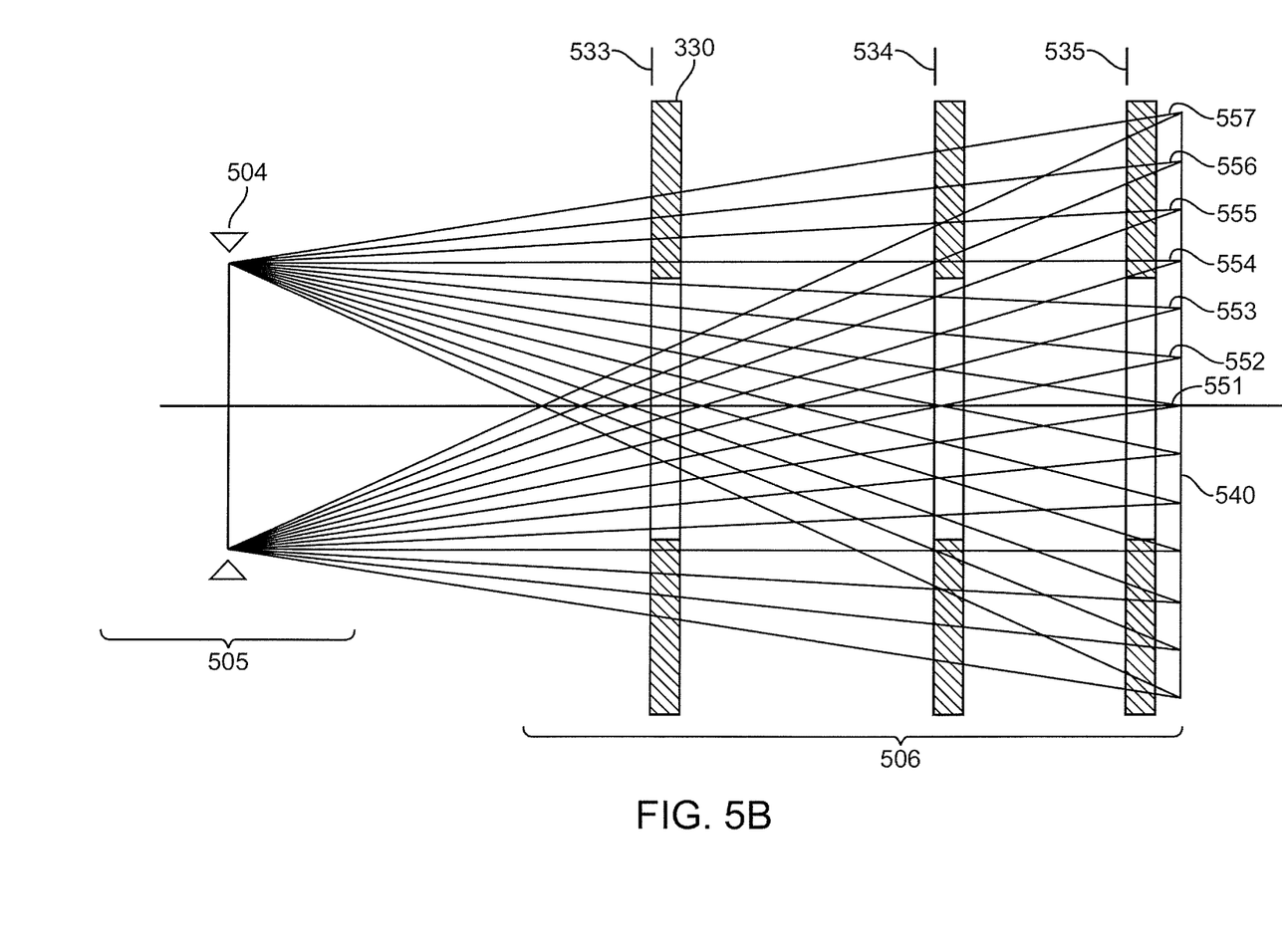

Referring to FIG. 5B, an optical system is illustrated schematically. Ray bundles emerge through an aperture 504, and form cones of light in the image space 506 and then form an image at 540. Rays within the group 551 are on-axis. The ray bundles 552, 553, 554, 555, 556, and 557 depict cones of light at progressively larger off-axis positions. A filter 330, described above, is located within the system's image space 506. The filter may be rotated about the optical axis and or translated along the optical axis. FIG. 5B illustrates filter 330 located at three positions 533, 534, and 535. In a real system, only one filter at one position would be used at any given time. The illustration illustrates these positions together in order to enable comparison. If the filter is located at position 533, the ray bundles directed toward points 551, 552, 553 pass through unfiltered, while the remainder bundles experience an increasing degree of filtration at increasing off-axis position, i.e. 557 is more filtered than 556, 556 is more filtered than 555, etc., but none of the light bundles, or image space cones, are fully filtered. If the filter is located at position 534, the ray bundles directed toward points 551, 552, 553 pass through unfiltered, the ray bundles 554 and 555 pass through partially filtered, and the ray bundles 556, 557 pass through fully filtered. Finally, if the filter is located closer to the image at position 535, the ray bundles 551, 552, 533 pass through unfiltered and all other ray bundles pass through fully filtered. In summary, the primary effect had by moving the filter away or toward an image or image conjugate, is the expansion or reduction of the transition region between unfiltered and filtered light as experienced at the image plane. The secondary effect of moving the filter axially is that of a radial shifting of the transition region itself. The direction and rate of change of the radial shifting of the whole of the transition region is directly influenced by the nature of the image space beam: a telecentric image space will experience no radial shifting as the transition region size is altered through axial filter movement, a divergent image space (i.e. FIGS. 5A & 5B) will experience a reduction in average radial size of the transition region in the as-displayed image as the filter moves toward the image 540, and a convergent image space beam will show the reverse of this.

Figure 5C:
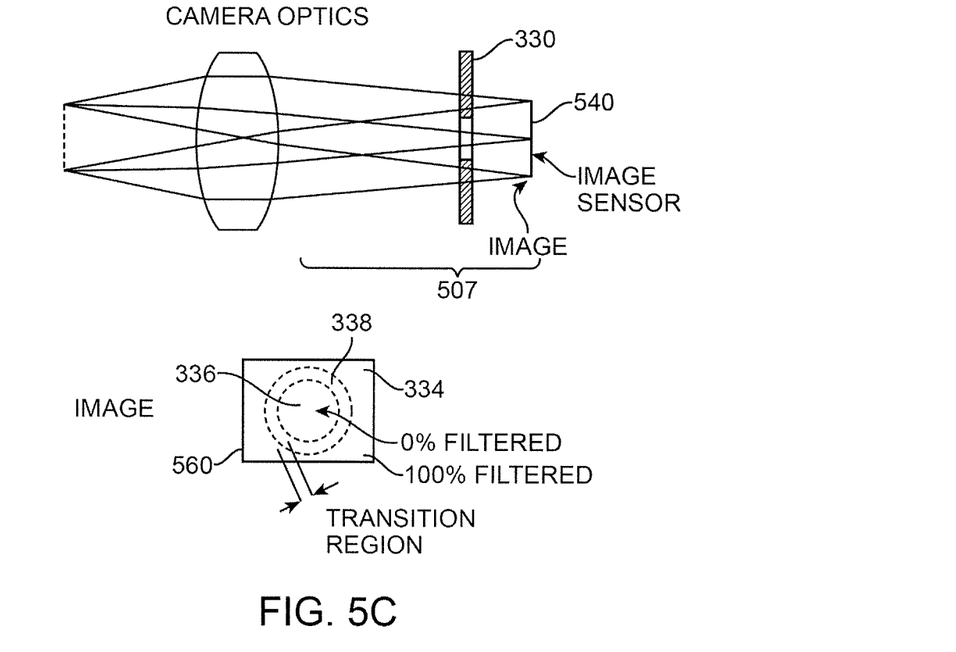
Figure 5D:
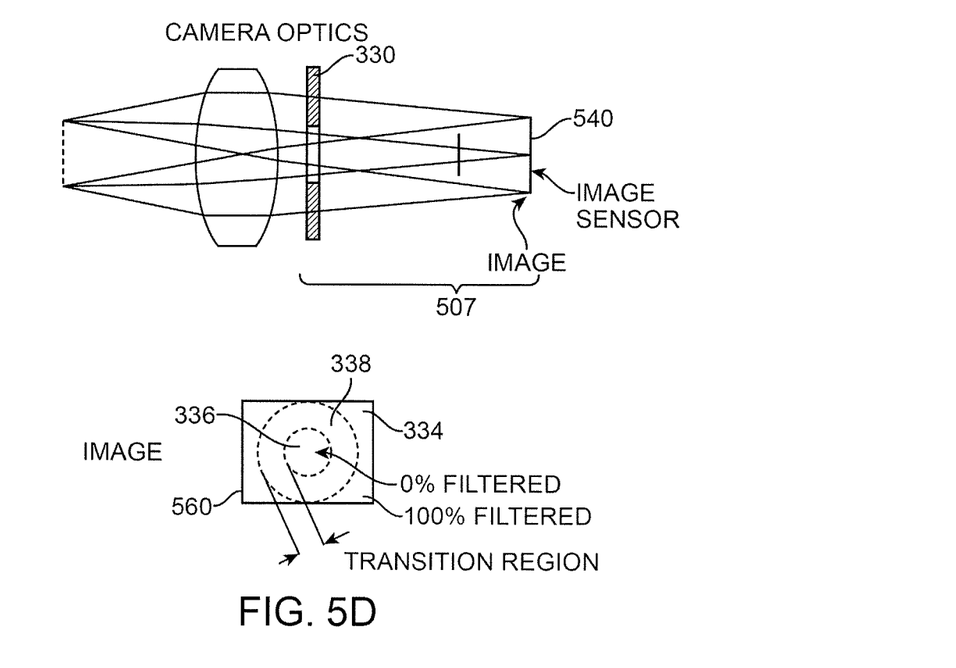

As further shown in FIGS. 5C and 5D, the closer the filter 330 is to the image plane, e.g., the sensor, the sharper the transition region. The image space 507 is near telecentric, and therefore, as explained above, the contraction or expansion of the transition region in the image plane is not coupled with the change in radial position for the region itself, i.e. the mid point of transition occurs at the same off-axis position regardless of the filter's axial location within the telecentric image space beam. As can be seen in comparing FIGS. 5C and 5D, a transition region 338 between unfiltered and fully filtered regions is sharper when the filter 330 is closer to the image than when the filter 330 is farther from the image. Such a softer (i.e., less sharp, less abrupt) transition may be preferred in certain applications.

Figure 6A:
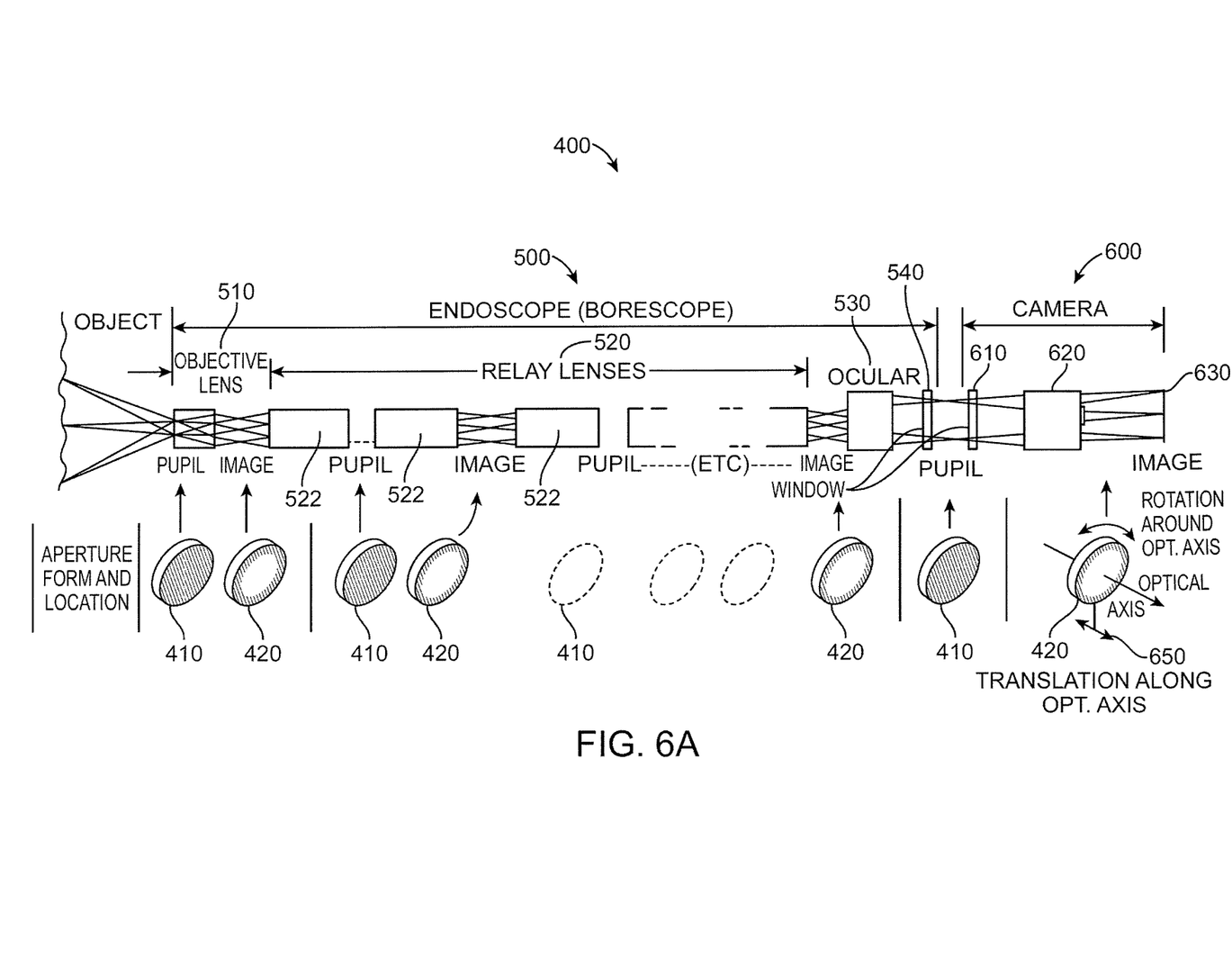
FIGS. 6A to 6C illustrate some functional positions for full and partial aperture polarizers in an endoscopic system and illustrate how the position of a partial aperture filter affects soft or hard transitions in the image plane.
Figure 6B:
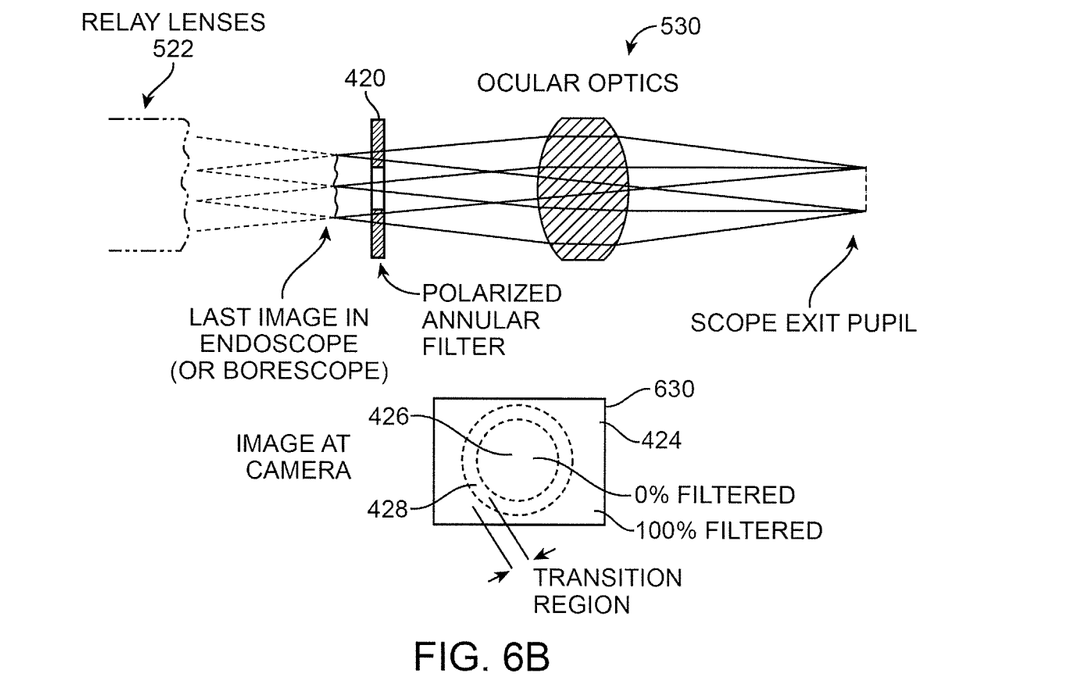
Figure 6C:
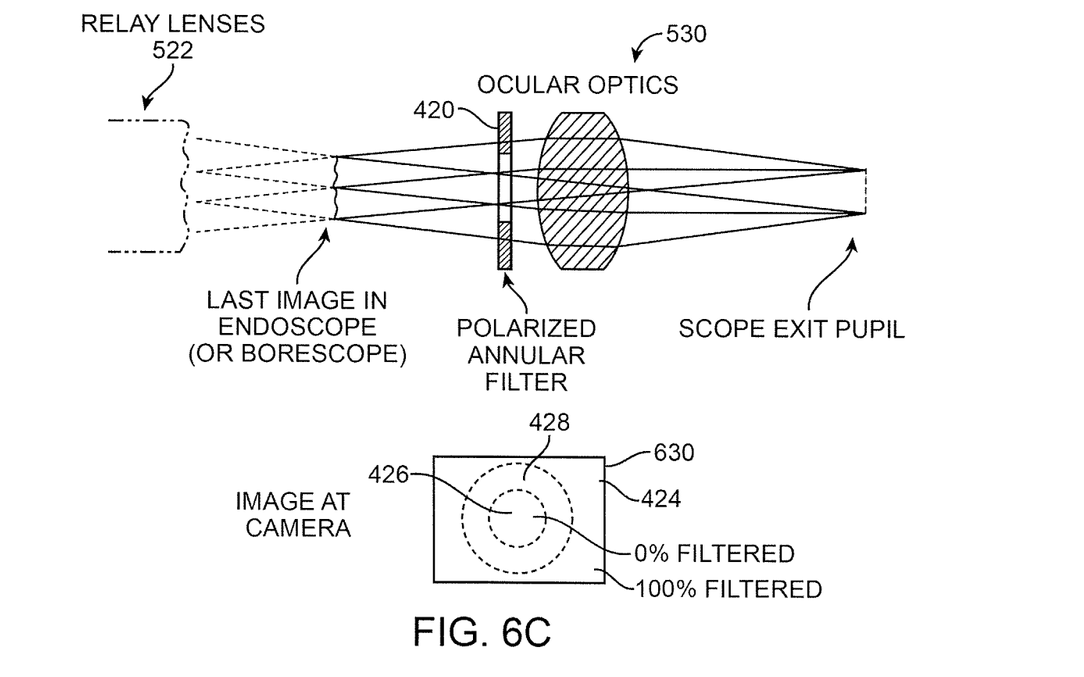

Another example of a system using polarization-dependent filters in accordance with embodiments is illustrated in FIGS. 6A to 6C. As shown in FIG. 6A, a system 400 may include an endoscope (or borescope or periscope) 500 and a camera system 600.

The endoscope 500 may include objective lenses 510 providing an image to relay lenses 520, including one or more relay lens 522, and an ocular lens 530. The beam exits the endoscope 500 via a rear window 540. One of the objective lenses 510, e.g., a first lens of the endoscope 500, may be a birefringent lens, e.g., a sapphire lens. The endoscope 500 may include birefringent, e.g., sapphire, entrance and exit windows. The camera 600 may include a front window 610 to receive the light from the endoscope 500, camera optics 620, and an image sensor 630.

As noted above, depending upon illumination requirements, a polarization-dependent full filter 410 may be provided anywhere in the system 400. When a polarization-dependent filter is to be used in an existing system, i.e., the endoscope 500 and the camera 600 already exist and do not include any polarization-dependent filters, a polarization-dependent full filter 410 may be installed between the rear window 540 of the endoscope 500 and the front window 610 of the camera 600, e.g., part of a coupler between the endoscope 500 and the camera 600, a fixed add-on to the endoscope 500, or integrated with the camera 600.

As further noted above, a polarization-dependent partial filter 420 may be provided at or near an image plane or any conjugate thereof of the system 400. When used in the endoscope 500, the orientation and position of the polarization-dependent partial filter 420 may be fixed to be aligned with the birefringent lens. When used in the camera 600, the polarization-dependent partial filter 420 may be mounted on an adjustable mount 650. The adjustable mount 650 may include a rotational mechanism to rotate the polarization-dependent partial filter 420 about the optical axis and/or a translational mechanism to move the polarization-dependent partial filter 420 along the optical axis. Thus, the polarization-dependent partial filter 420 in the camera 600 may be adjusted in accordance with the endoscope 500 to be used in the system 400. A similar rotation mechanism may be used in an instance where a polarization-dependent full filter 410 is used in the coupler space between the camera and the endoscope, specifically between the windows 610 and 540.

When used in the endoscope 500, as further shown in FIGS. 6B and 6C, the closer the polarization-dependent partial filter 420 is to an image in the endoscope 500, the sharper the transition region. As can be seen in comparing FIGS. 6B and 6C, a transition region 428 between unfiltered region 426 and fully filtered region 424 is sharper when the filter 420 is closer to the image than when the filter 420 is further from the image. Such a softer, less abrupt transition may be preferred in certain applications.

By way of summation and review, one or more embodiments may provide polarization-dependent filters that facilitate use of a birefringent lens by reducing or eliminating an image of a first polarization to enhance clarity of an image of a second polarization.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system, comprising:
 a birefringent lens that outputs light of a first polarization and light of a second polarization;
 an image plane in which images of light having the first polarization and the second polarization are focused after transmission by the birefringent lens; and
 a polarization filter that transmits light of the first polarization and the second polarization in a central region thereof and transmits light of the first polarization and blocks light of the second polarization outside the central region, wherein the polarization filter is in a plane that is not at or near a system aperture or any conjugate thereof.

2. The system as claimed in claim 1, further comprising a translation mechanism to change a distance between the polarization filter and the birefringent lens.

3. The system as claimed in claim 2, further comprising a rotation mechanism to change a relative angle between the polarization filter and the birefringent lens.

4. The system as claimed in claim 1, further comprising a rotation mechanism to change a relative angle between the polarization filter and the birefringent lens.

5. The system as claimed in claim 4, wherein the birefringent lens is fixed and the rotation mechanism is to rotate the polarization filter.

6. A system, comprising:
 a birefringent lens that outputs light of a first polarization and light of a second polarization;
 a polarization filter that transmits light of the first polarization and light of the second polarization incident in a central region thereof and transmits light of the first polarization and blocks light of the second polarization outside the central region; and
 a camera system having camera optics receiving light from the birefringent lens the camera system including an image plane in which images of light having the first polarization and the second polarization are focused after transmission by the birefringent lens, wherein the polarization filter is between a system aperture of the camera system and the image plane thereof.

7. The system as claimed in claim 6, wherein the polarization filter is closer to the system aperture than to the image plane.

8. The system as claimed in claim 6, wherein the polarization filter is farther from the system aperture than from the image plane.

9. The system as claimed in claim 6, further comprising a rotation mechanism to change a relative angle between the polarization filter and the birefringent lens.

10. The system as claimed in claim 9, wherein the birefringent lens is fixed and the rotation mechanism is to rotate the polarization filter.

11. A system comprising:
 a birefringent lens that outputs light of a first polarization and light of a second polarization;
 a polarization filter that transmits light of the first polarization and light of the second polarization incident in a central region thereof and transmits light of the first polarization and blocks light of the second polarization outside the central region;
 a camera system; and
 an endoscope system between the birefringent lens and the camera system, wherein the endoscope system includes a relay system and an ocular system, and the polarization filter is between the relay system and the ocular system.

12. A method of filtering polarized light, the method comprising:
 providing a birefringent lens; and
 providing a polarization filter in optical communication with the birefringent lens and in a plane that is not at or near a system aperture or any conjugate thereof, the polarization filter:
  transmitting light of a first polarization to form a first image focused on an image plane using the birefringent lens;
  transmitting light of a second polarization in a central region of the polarization filter to form a second image focused on the image plane using the birefringent lens; and
  filtering out light of the second polarization outside the central region of the polarization filter.

13. The method as claimed in claim 12, wherein filtering out light includes fully filtering out light of the second polarization outside the central region.

* * * * *